DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED OCTOBER 30, 1973

915 O.G. 1568

T915,011

FLUOROELASTOMER COMPOSITION

James Ray Hoover, Wilmington, and James Daniel MacLachlan, Hockessin, Del., assignors to E. I. du Pont de Nemours and Company, Wilmington, Del.

Filed June 30, 1972, Ser. No. 268,023

Int. Cl. C08g *45/04*

U.S. Cl. 260—836

No Drawing. 16 Pages Specification

A curable fluoroelastomer composition having improved resistance to shrinkage during molding, which cures to a composition having other desirable properties such as good tear strength and elongation can be made by mixing the following: (A) an elastomeric copolymer of vinylidene fluoride and at least one other fluorinated monomer, (B) a polyhydroxylic aromatic compound cross-linking agent for said copolymer, (C) a suitable vulcanization accelerator, such as a quaternary phosphonium or ammonium compound, (D) a suitable metal compound such as a divalent metal oxide or hydroxide, and (E) a polyepoxide having a functionality of at least two. Particularly useful compositions of this type can be made from copolymers of vinylidene fluoride and hexafluoropropylene (polymerized in a molar ratio of 85:15 to 50:50) and, per 100 parts of copolymer, 0.1–5 parts of hexafluoroisopropylidene-bis(4 - hydroxybenzene), 0.1–3 parts of benzyltriphenylphosphonium chloride, 1–20 parts of magnesium oxide or a mixture of magnesium and calcium oxides, and 0.5–10 parts of difunctional epoxy resin made from epichlorohydrin and bisphenol A. Curing is accomplished by heating for 3–30 minutes at about 149–204° C. and optionally postcuring for 1–48 hours at about 204–260° C.